United States Patent [19]
Ehrlich

[11] Patent Number: 5,562,981
[45] Date of Patent: Oct. 8, 1996

[54] TRAILER WITH FIBERGLASS REINFORCED PLASTIC SIDE PANELS AND METHOD OF MAKING THE SAME

[75] Inventor: Rodney P. Ehrlich, Monticello, Ind.

[73] Assignee: Wabash National Corporation, Lafayette, Ind.

[21] Appl. No.: 321,031

[22] Filed: Oct. 5, 1994

[51] Int. Cl.$^6$ ..................................................... B32B 18/00
[52] U.S. Cl. .................. 428/325; 428/304.4; 428/312.6; 264/258; 156/229; 52/309.13; 52/309.14
[58] Field of Search ..................................... 428/306, 246, 428/408, 241, 311, 313, 315, 317, 308, 322, 406, 325, 304.4; 264/571, 258, 321; 156/222, 295; 52/79.1, 125.2, 272, 309.13, 309.4, 309.15, 811, 765, 264, 267

[56] References Cited

U.S. PATENT DOCUMENTS

| | | | |
|---|---|---|---|
| 4,034,137 | 7/1977 | Hofer | 428/308 |
| 4,268,574 | 5/1981 | Peccenini et al. | 52/309.15 X |
| 4,892,774 | 1/1990 | Vallance | 156/222 X |
| 5,068,001 | 11/1991 | Haussling | 156/222 |
| 5,334,427 | 8/1994 | Cognet et al. | 428/34.5 |

Primary Examiner—Wynn Wood
Assistant Examiner—David Jersen
Attorney, Agent, or Firm—Trexler, Bushnell, Giangiorgi & Blackstone, Ltd.

[57] ABSTRACT

A trailer structure includes a floor and at least one side wall connected to and extending upwardly therefrom. Each side wall is lightweight and includes two sheets, each of which is made of a fiberglass reinforced plastic material with hollow glass or ceramic beads intermixed therewith along a surface of the sheet to form a bead-rich surface. The sheets are bonded together along the bead-rich surfaces. Each of the sheets taper along its outer surface from the bottom end to the top end of the wall.

14 Claims, 1 Drawing Sheet

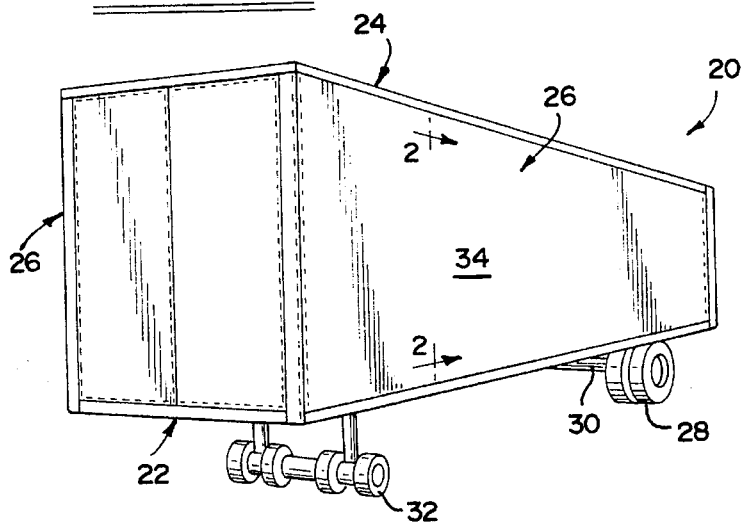
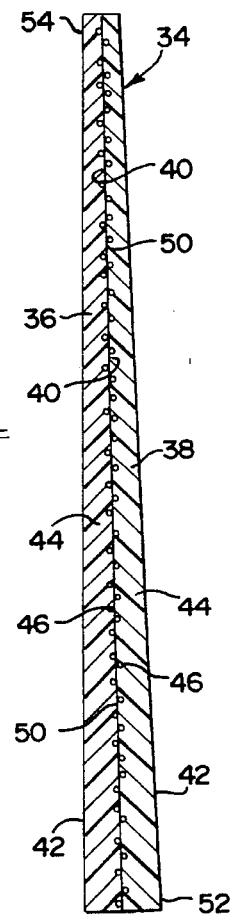
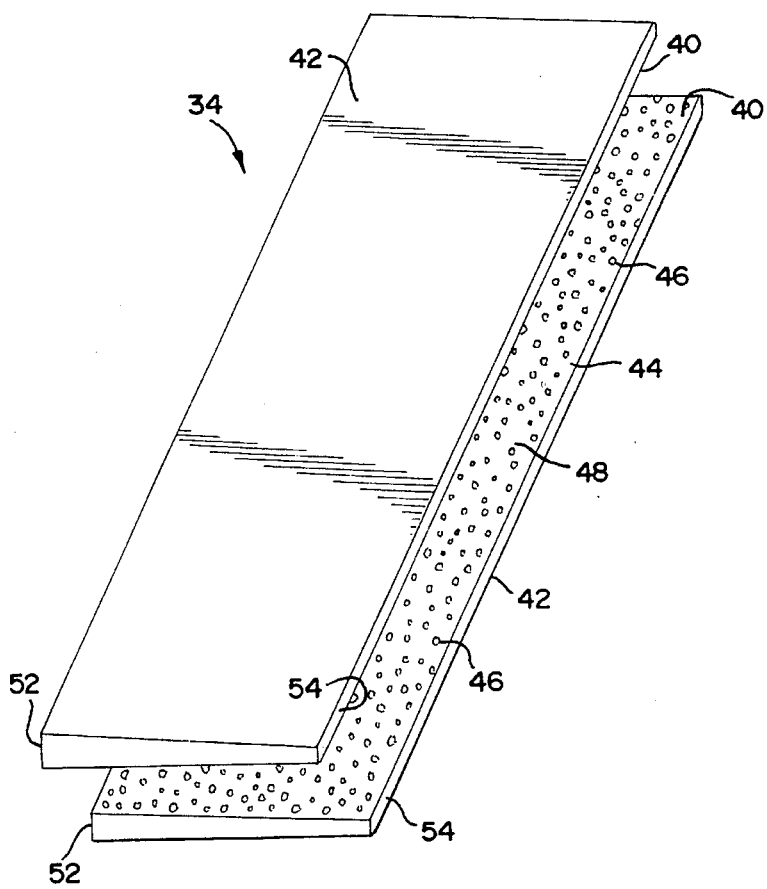

5,562,981

TRAILER WITH FIBERGLASS REINFORCED PLASTIC SIDE PANELS AND METHOD OF MAKING THE SAME

BACKGROUND OF THE INVENTION

This invention is generally directed to a vehicle, such as a trailer, van or the like, with side walls constructed of a novel fiberglass reinforced plastic.

Prior art trailer side walls have been formed from panels made of sheets of plywood having inner and outer surfaces covered with a thin cover sheet of fiberglass reinforced plastic. While such panels have generally been satisfactory, it has been found that the thin, fiberglass reinforced plastic cover sheets are relatively easily punctured when, for example, struck by another vehicle or by a fork-lift truck or the like. If the fiberglass reinforced plastic sheets are increased as to thickness, the wall becomes too heavy and expensive.

Other prior art trailers have eliminated the plywood and used a solid fiberglass reinforced plastic sheet for the walls which might, for example, be nearly a half-inch thick. Again, such solid sheets are expensive and too heavy.

The present invention presents a novel side wall construction for a vehicle, such as a trailer, van or the like, that is intended to overcome these problems and other inherent problems in the prior art as well as to present several other advantages and improvements.

OBJECTS AND SUMMARY OF THE INVENTION

A general object of the present invention is to provide a novel side wall for a vehicle, such as a trailer, van or the like.

An object of the present invention is to provide a novel side wall for a vehicle formed by joining two sheets together made of fiberglass reinforced plastic and hollow glass or ceramic beads.

Another object of the present invention is to provide a novel side wall for a vehicle that is lightweight and cannot be easily punctured.

Briefly, and in accordance with the foregoing, the present invention discloses a vehicle structure, such as one for a trailer, van or the like, which includes a floor and at least one side wall connected to and extending upwardly therefrom. Each side wall is lightweight and includes two sheets, each of which is made of a fiberglass reinforced plastic material with hollow glass or ceramic beads intermixed therewith. When the fiberglass reinforced plastic material and the hollow glass or ceramic beads are intermixed, the beads tend to float to one surface of the sheet so as to make one surface of the sheet bead-rich. The sheets are bonded together along the bead-rich surfaces. Each of the sheets are tapered along its outer surface from the bottom end to the top end of the wall. The resulting wall is lightweight, strong and cannot be easily punctured.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a trailer which have side walls which incorporate the features of the invention;

FIG. 2 is a cross-sectional view of a side wall of FIG. 1 along line 2—2; and

FIG. 3 is an exploded perspective view of a side wall of the present invention.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention discloses a novel side wall panel construction for use in a vehicle, such as a trailer 20, as shown in FIG. 1, van or the like. The trailer 20 generally includes a floor 22, a roof 24, and novel side wall 26 which incorporates features of the present invention. The trailer 20 also includes wheels 28, one or more axles 30 for supporting a rearward end of the trailer and a landing gear 32 for supporting the trailer 20 when the trailer 20 is not attached to a tractor or the like.

Each side wall 26 includes a panel 34. Alternatively, each side wall 26 could be made up from a plurality of such panels 34 fastened together. The panel 34 is connected to the floor 22 and extends upwardly therefrom and is attached to upper and lower rails of the trailer 20 by suitable joining members, such as bolts or studs.

As shown in FIGS. 2 and 3, the panel 34 includes two sheets 36, 38. Each sheet 36, 38 is generally rectangular and includes a first or inner surface 40 and a second or outer surface 42.

Each sheet 36, 38 is made of a first suitable, lightweight material 44 with a second suitable, lightweight material 46 intermixed with the first material 46 when the sheets 36, 38 are formulated. The sheets 36, 38 may be formulated by intermixing the two materials 44, 46 together and allowing the sheets 36, 38 to solidify in molds. The second material 46 has a density which is less than the density of the first material 44. The preferred material for the first material 44 is a tough, strong and hard fiberglass reinforced plastic such as a polyester resin. Preferred materials for the second material 46 are hollow glass beads or hollow ceramic beads. These intermixed materials 44, 46 provide a lightweight sheet 36, 38 which is of a lighter weight than prior art trailer walls as described hereinabove.

When the hollow ceramic or glass beads 46 are mixed with the fiberglass reinforced plastic material 44 when formulating the sheets 36, 38, the beads 46 tend to float to one surface 48 (the top surface) of the sheet 36, 38 when the mixture is hardening causing that surface 48 of the sheet 36, 38 to become bead-rich. This presents a disadvantage because when the sheet 36, 38 is placed in tension, the sheet 36, 38 is relatively weak. In order to provide a side wall 26 that can be placed in tension without the wall 26 rupturing, two sheets 36, 38, which have been formulated as disclosed herein, are laminated together, by suitable means such as a known adhesive 50, capable of bonding with the polyester resin and beads, along each sheet's bead-rich surface 48. Thus, when the panel 34 is formed, the beads 46 are in the center of the panel 34, as shown in FIG. 2, and along the inner surface 40 of each sheet 36, 38, as shown in FIG. 3. The resulting side wall 26 is lightweight and strong and will not rupture under tension.

In order to further reduce the weight of the side walls 26, and thus the trailer 20, the second or outer surface 42 of each sheet 36, 38 can be tapered from the bottom end 52 of the panel 34 to the top end 54 of the panel 34 thereby reducing the thickness. For example, for a typical trailer wall panel that is one hundred and ten inches high, a panel formed in accordance with the present invention can be approximately three-eights of an inch thick at the bottom edge and three-sixteenths of an inch thick at the top edge. In addition, the outer surface 42 of each panel 34 may be finished.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A trailer structure comprising:

a floor and at least one side wall connected to and extending upwardly from the floor, said side wall comprising two sheets, each of said sheets having an inner surface and an outer surface and being comprised of a tough, strong, fiberglass reinforced plastic material of a predetermined density, a plurality of hollow beads intermixed throughout said fiberglass reinforced plastic material, each hollow bead being of a predetermined density which is less than the density of said fiberglass reinforced plastic material, said hollow beads being relatively highly concentrated along portions of said inner surface of said sheet and substantially less concentrated toward said outer surface, said inner surfaces of said sheets being secured together.

2. A trailer structure as defined in claim 1, wherein said outer surfaces of said sheets are tapered from the bottom end to the top end of said side wall.

3. A trailer structure as defined in claim 1, wherein each said hollow bead comprises a glass bead.

4. A trailer structure as defined in claim 1, wherein each said hollow bead comprises a ceramic bead.

5. A trailer structure as defined in claim 1, wherein said inner surfaces of said sheets are secured together with adhesive.

6. A panel comprising:

two sheets, each of said sheets having an inner surface and an outer surface and being comprised of a tough, strong, fiberglass reinforced plastic material of a predetermined density, a plurality of hollow beads intermixed throughout said fiberglass reinforced plastic material, each hollow bead being of a predetermined density which is less than the density of said fiberglass reinforced plastic material, said hollow beads being relatively highly concentrated along portions of said inner surface of said sheet and substantially less concentrated towards said outer surface, said inner surfaces of said sheets being secured together.

7. A panel as defined in claim 6, wherein said outer surfaces of said sheets are tapered.

8. A panel as defined in claim 6, wherein each said hollow bead comprises a glass bead.

9. A panel as defined in claim 6, wherein each said hollow bead comprises a ceramic bead.

10. A panel as defined in claim 6, wherein said inner surfaces of said sheets are secured together with adhesive.

11. A method of making a panel comprising:

formulating first and second separate sheets by:

providing a first material of a predetermined density hardenable into a tough, strong, fiberglass reinforced plastic material providing a second material comprising a plurality of hollow beads of a predetermined density, each said hollow bead having a density which is less than the density of said first material, intermixing said first material and said hollow beads together to form a mixture, hardening said first material to form said tough, strong, fiberglass reinforced plastic material while floating said hollow beads to one surface of the mixture to form a lower density bead-rich surface along said one surface of the mixture, the hardened mixture forming the respective sheet; and securing said first and second sheets together along the lower density bead-rich surfaces.

12. A method as defined in claim 11, wherein each said hollow bead comprises a glass bead.

13. A method as defined in claim 11, wherein each said hollow bead comprises a ceramic bead.

14. A method as defined in claim 11, wherein said sheets are secured together by laminating said sheets together with adhesive.

* * * * *